(12) United States Patent
Kusanagi et al.

(10) Patent No.: US 7,399,035 B2
(45) Date of Patent: Jul. 15, 2008

(54) SEAT FOR VEHICLE

(75) Inventors: Hiroki Kusanagi, Kokubu (JP); Yasuo Suga, Kariya (JP); Masamitsu Iwatani, Kariya (JP)

(73) Assignee: Toyota Shatai Kabushiki Kaisha, Aichi (JP)

( * ) Notice: Subject to any disclaimer, the term of this patent is extended or adjusted under 35 U.S.C. 154(b) by 51 days.

(21) Appl. No.: 10/545,289

(22) PCT Filed: Dec. 22, 2003

(86) PCT No.: PCT/JP03/16506

§ 371 (c)(1),
(2), (4) Date: Jun. 19, 2006

(87) PCT Pub. No.: WO2004/074034

PCT Pub. Date: Sep. 2, 2004

(65) Prior Publication Data

US 2006/0255640 A1 Nov. 16, 2006

(30) Foreign Application Priority Data

Feb. 19, 2003 (JP) ............................. 2003-041720

(51) Int. Cl.
*A47C 1/00* (2006.01)
*B60N 2/02* (2006.01)

(52) U.S. Cl. ........................... 297/344.24; 297/344.21; 296/65.07; 296/65.12

(58) Field of Classification Search ............ 297/344.21, 297/344.22, 344.23, 344.24, 65.06, 65.07, 297/65.11, 65.12
See application file for complete search history.

(56) References Cited

U.S. PATENT DOCUMENTS

| 2,290,464 | A | * | 7/1942 | Buchheit | 296/65.07 |
|---|---|---|---|---|---|
| 4,600,239 | A | * | 7/1986 | Gerstein et al. | 297/344.23 |
| 4,834,452 | A | * | 5/1989 | Goodrich | 297/240 |
| 4,846,529 | A | * | 7/1989 | Tulley | 297/344.23 |
| 5,524,952 | A | * | 6/1996 | Czech et al. | 296/65.12 |
| 5,540,482 | A | * | 7/1996 | Baret et al. | 297/344.22 |
| 6,024,398 | A | * | 2/2000 | Horton et al. | 296/65.07 |
| 6,402,114 | B1 | * | 6/2002 | Carnahan et al. | 248/425 |
| 6,557,919 | B2 | * | 5/2003 | Suga et al. | 296/65.07 |
| 7,316,441 | B2 | * | 1/2008 | Iwatani et al. | 296/65.12 |
| 2006/0131943 | A1 | * | 6/2006 | Iwatani et al. | 297/344.21 |

FOREIGN PATENT DOCUMENTS

| EP | 0 808 740 A2 | 11/1997 |
|---|---|---|
| JP | 62-101554 | 5/1987 |
| JP | 2002-154357 | 5/2002 |

* cited by examiner

*Primary Examiner*—Sarah B McPartlin
(74) *Attorney, Agent, or Firm*—Patterson, Thuente, Skaar & Christensen, P.A.

(57) ABSTRACT

The present invention provides a mechanism that can release the rotation lock mechanism without using an actuator.

In the present vehicle seat, a nut (73) is moved upon rotation of a screw shaft (72) so that the seat body is moved in the lateral direction of the vehicle. When the nut (73) is moved by a desired distance, a guide roller (69) is pushed so that an operation arm (66) is moved parallel with the guide roller. As a result, a lock plate (64) is rotated in an unlock direction so that a claw (64a) is disengaged from a striker (61).

4 Claims, 12 Drawing Sheets

SEAT FOR VEHICLE

TECHNICAL FIELD

This invention relates to vehicle seats that enables an elderly person, a physically challenged person or other such persons (which will be hereinafter simply referred to as a passenger or an occupant) to easily get into and out of a vehicle.

BACKGROUND ART

Recently, various types of seats have been provided for this kind of situation. For example, a vehicle seat is disclosed in JP 9-39622. This vehicle seat has a rotation mechanism for rotating a seat body, a longitudinal slide mechanism for sliding the seat body in the longitudinal direction of the vehicle, and an ascent/descent mechanism that lowers the seat body to a lower position while moving the seat body to the exterior of the vehicle, under the conditions that the seat body is directed to the door opening by the rotation mechanism.

According to this vehicle seat, by moving the seat body to the exterior of the vehicle and lowering the seat body to a height close to the road surface, the passenger can be easily seated on the seat body external to the vehicle. Thereafter, by directly moving the seat body to the interior of the vehicle, the occupant can very easily reach a predetermined position in the interior of the vehicle. Conversely, the occupant can move to the exterior of the vehicle in the reverse way.

Further, by utilizing a driving motor as a drive source in order to operate each of the mechanisms for moving the seat body, the passenger can more easily get into and out of the vehicle. As a result, it is possible to significantly reduce the burden of care personnel.

DISCLOSURE OF THE INVENTION

However, the above-described conventional vehicle seat still needs to be improved. That is, in a rotation lock mechanism for restricting the rotating motion of the seat body, for the sake of convenience of the occupant, a dedicated electric motor for operating the rotation lock mechanism is conventionally used in order to automatically release the rotation lock condition of the seat body at the proper time.

In this conventional electric release mechanism for the rotation lock mechanism, it is necessary to use an actuator, such as a dedicated electric motor, for operating the rotation lock mechanism. This may lead to high manufacturing costs. Also, it is necessary to provide a space for receiving the actuator. In addition, it is necessary to provide electric wiring for the electric motor. This may impair, for example, the workability of assembly or maintenance.

It is accordingly an object of the present invention to provide vehicle seats that can automatically release the rotation lock condition of the seat body with the appropriate timing and without using any dedicated actuator, such as an electric motor for operating the rotation lock mechanism, so that convenience can be secured for the occupant.

To achieve this object, the present invention provides a vehicle seat having a construction as claimed in the appended claims.

According to a vehicle seat corresponding to one embodiment of the present invention as, in a condition in which a seat body faces the front side of a vehicle, a rotation lock condition of the seat body is unlocked by operating a slide mechanism to some degree so that a member that can move thereupon, moves and interacts with a rotation lock mechanism. Accordingly, it is possible to release the rotation lock condition without using a dedicated actuator such as an electric motor for operating the rotation lock mechanism as in the prior art. As a result, increased manufacturing costs can be avoided. Also, it is not necessary to provide a space for receiving the actuator as in the prior art. Further, since there is no need to use a dedicated actuator for operating the rotation lock mechanism as in the prior art, it is not necessary to provide electric wiring for the actuator. This may lead to increased workability of assembly or maintenance for the vehicle seat.

The member that can move upon operation of the slide mechanism corresponds, for example, to a member that constitutes a driving device of this mechanism, such as a screw shaft or a nut meshing with the screw shaft, and also corresponds to the seat body or a base for supporting the seat body.

According to a vehicle seat corresponding to another embodiment of the present invention, in addition to the above effect, the operation of each mechanism and each portion is automatically performed in predetermined sequences. Therefore, it is possible to increase the usability of the vehicle seat.

According to a vehicle seat corresponding to a further embodiment of the present invention, in addition to the above effects, the seat body moves along a longitudinal direction of the vehicle when the lock condition by the rotation lock mechanism is released. Therefore, when the lock condition is released, the seat body does not abut a wall or other such parts.

According to a vehicle seat corresponding to still a further embodiment of the present invention, it is possible to reliably obtain the above effects with a relatively simple construction. Instead of the nut directly interacting with a lock plate, it is also possible for the nut to indirectly interact with the lock plate via an additional member.

BEST MODE OF THE INVENTION

Figure 1:
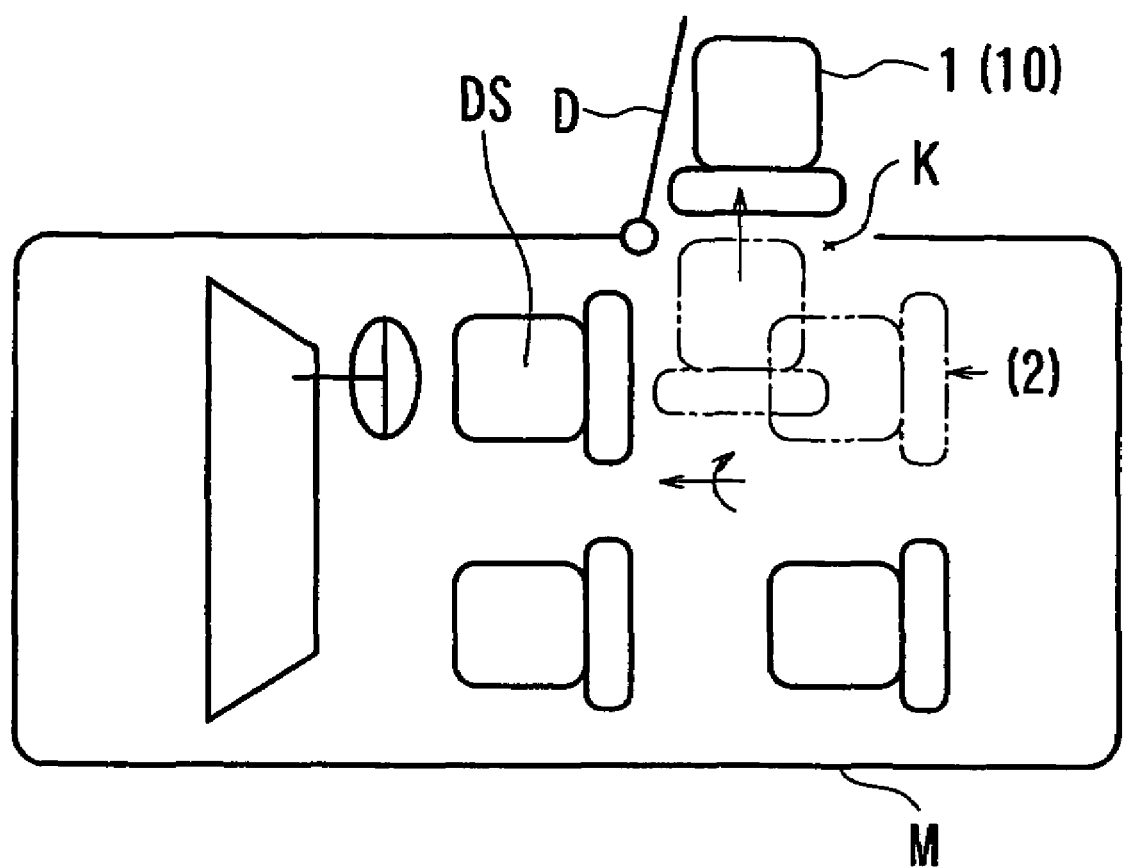
FIG. 1 is a plan view of a vehicle in which a vehicle seat according to an embodiment of the present invention is applied to a right rear seat.

An embodiment of the present invention will be described with reference to FIGS. 1 to 12. As shown in FIG. 1, this embodiment exemplifies a vehicle seat 1 that is arranged as a second row seat behind a driver's seat DS. In FIG. 1, a door D in the right side (the upper side in FIG. 1) of a vehicle M is opened, and a seat body 10 has been moved to the exterior by way of a door opening K. In the vehicle seat 1 of this embodiment, the seat body 10 can move in the longitudinal direction (the right and left direction in FIG. 1) of the vehicle and can rotate by approximately 90 degrees between a position where the seat body 10 faces the front side of the vehicle and a position where the seat body 10 faces the door opening K. Further, the seat body 10 can move in the lateral direction of the vehicle (the vertical direction in FIG. 1) while facing the door opening K.

Figure 2:
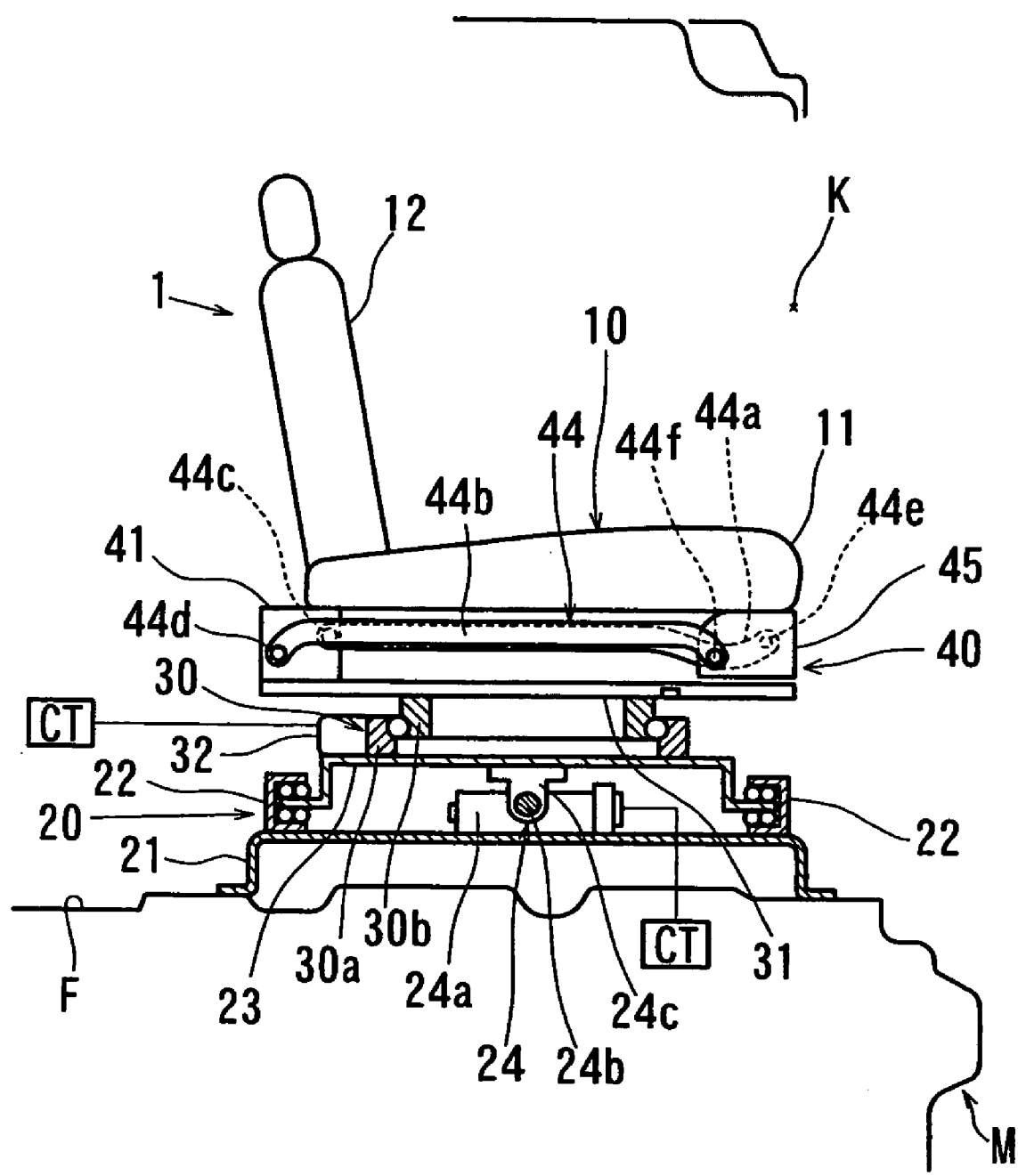
FIG. 2 is a rear view of the vehicle seat. This figure shows a condition in which the seat body has been rotated by approximately 90 degrees from a position where it had faced the front side of the vehicle to a position where it faces the door opening side.
Figure 3:
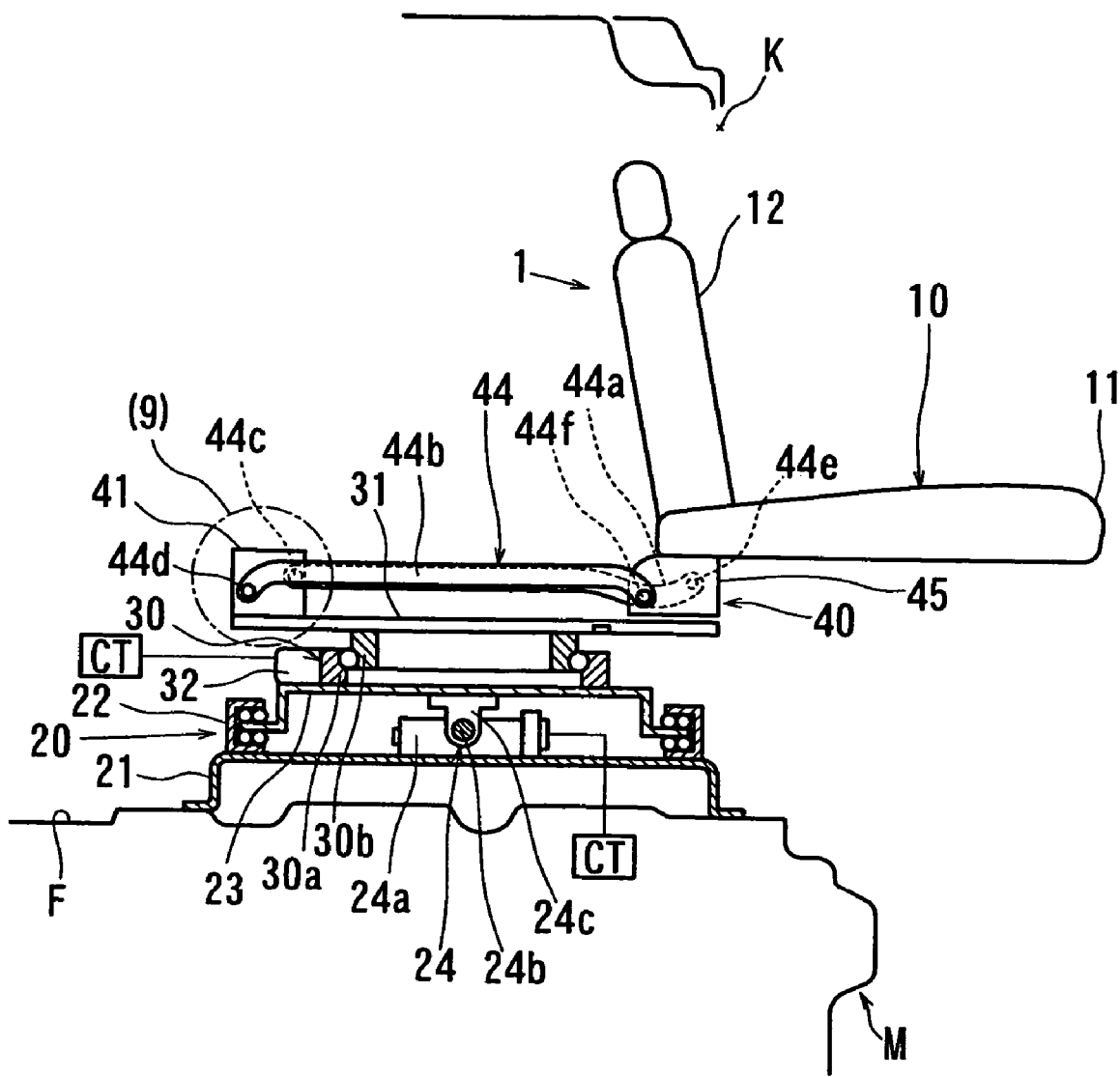
FIG. 3 is a rear view of the vehicle seat. This figure shows a condition in which the seat body has been moved to the exterior of the vehicle by an auxiliary slide mechanism.
Figure 4:
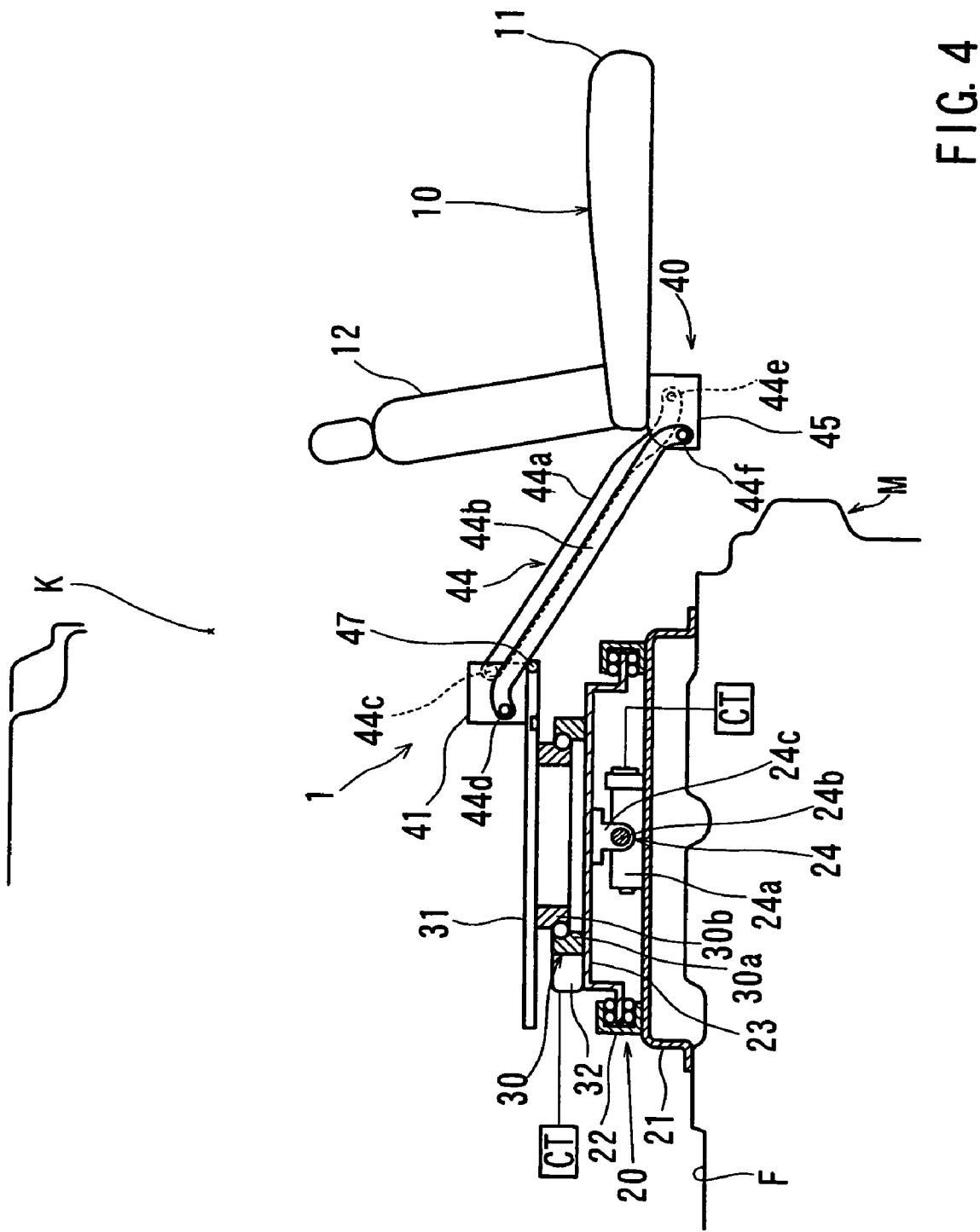
FIG. 4 is a rear view of the vehicle seat. This figure shows a condition in which the seat body has been moved to the exterior of the vehicle and lowered to a level close to the road surface by an ascent/descent slide mechanism.

As shown in FIGS. 2 to 4, the vehicle seat 1 includes the seat body 10, a first slide mechanism 20 for moving the seat body 10 in the longitudinal direction of the vehicle (the direction perpendicular to the plane of FIGS. 2 to 4), a rotation mechanism 30 for rotating the seat body 10 between the position where it faces the front side of the vehicle and the position where it faces the door opening K, a rotation lock mechanism 60 for restricting the rotating motion of the seat body 10, and a second slide mechanism 40 for raising and lowering the seat body 10 (when facing the door opening K) between the vehicle interior and vehicle exterior by way of the door opening K while moving the seat body 10 in the lateral direction of the vehicle. The second slide mechanism 40 of this embodiment corresponds to "a slide mechanism" as defined in the claims.

The seat body 10 includes a seat cushion 11 and a seat back 12. The first slide mechanism 20 is disposed on the upper surface of a stationary base 21 that is fixed to a floor F of the vehicle M. A longitudinal slide base 23 is disposed on the upper surface of the stationary base 21 via guide rails 22 so as to be slidable in the longitudinal direction of the vehicle M (the direction perpendicular to the plane of the drawings). The guide rails 22 have a U-shaped sectional configuration and are arranged in parallel to each other along the longitudinal direction of the vehicle. Mounted between the stationary base 21 and the longitudinal slide base 23 is a longitudinal driving device 24 that has a longitudinal slide motor 24a, a screw shaft 24b rotated by the longitudinal slide motor 24a, and a nut 24c meshing with the screw shaft 24b. According to the longitudinal driving device 24, when the screw shaft 24b rotates upon the actuation of the longitudinal slide motor 24a, the nut 24c meshing with the screw shaft 24b moves in the axial direction of the screw shaft 24b so that the longitudinal slide base 23 moves to the front or rear side of the vehicle. The rotation mechanism 30 is mounted on an upper surface of the longitudinal slide base 23.

The rotation mechanism 30 has an outer ring 30a and an inner ring 30b that are combined so as to be coaxially rotatable relative to each other. The outer ring 30a is fixed to an upper surface of the longitudinal slide base 23. The inner ring 30b is fixed to a lower surface of a rotation base 31. A rotary motor 32 is attached to the upper surface of the longitudinal slide base 23. The rotational output force of the rotary motor 32 is transmitted to the inner ring 30b via a gear transmission mechanism (not shown), so that the rotation base 31, the second slide mechanism 40 disposed on the upper surface thereof, and the seat body 10, are all integrally rotated. As shown in FIG. 1, the seat body 10 rotates clockwise by approximately 90 degrees from the position where it had faced the front side of the vehicle and is then moved to the exterior of the vehicle by way of the door opening K.

Further, the rotation lock mechanism 60 is disposed between the rotation base 31 and the longitudinal slide base 23. Through the rotation lock mechanism 60, the rotation base 31 and consequently the seat body 10 are unrotatably locked in the position where the seat body 10 faces the front side of the vehicle.

Figure 6:
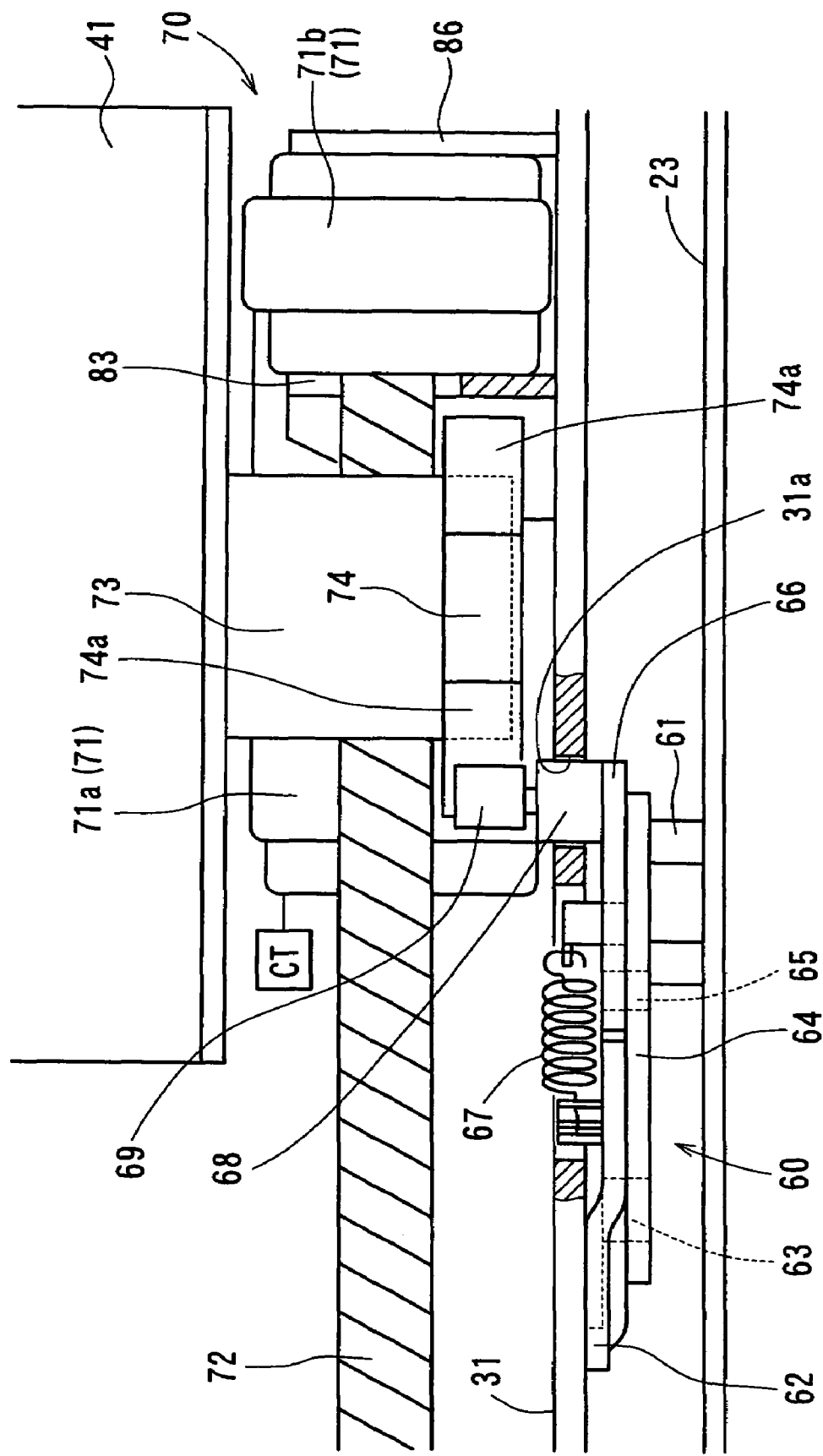
FIG. 6 is a side view of the ascent/descent driving device and the rotation lock mechanism.
Figure 7:
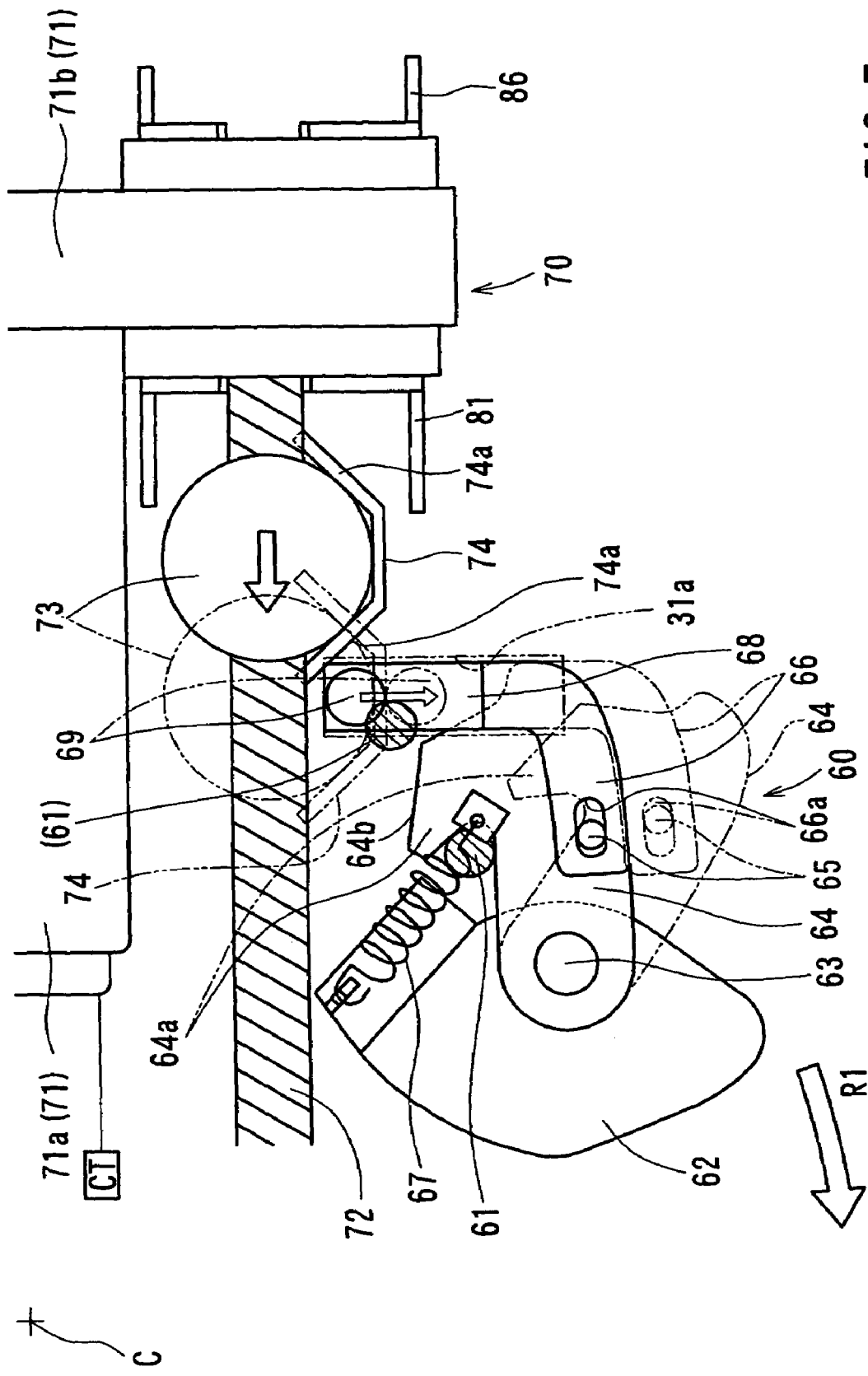
FIG. 7 is a plan view of the ascent/descent driving device and the rotation lock mechanism.

FIGS. 6 and 7 show the rotation lock mechanism 60 in detail. As shown in the drawings, the rotation lock mechanism 60 has a striker 61 attached to the upper surface of the longitudinal slide base 23, a lock base 62 attached to the lower surface of the rotation base 31, a lock plate 64 rotabaly supported on the lock base 62 via an axle 63, and an operation arm 66 relatively tiltably supported on the lock plate 64 via an axle 65.

The lock base 62 is fixed to the lower surface of the rotation base 31. The lock plate 64 is supported by the lock base 62 so as to be rotatable along the lower surface of the rotation base 31. A claw 64a is formed in the rotational leading end of the lock plate 64. In the condition in which the seat body 10 is in the position where it faces the front side of the vehicle, the rotating movement of the rotation base 31 and consequently the seat body 10 toward the door opening K is restricted when the claw 64a is hooked to the striker 61.

A tension spring 67 is disposed between the lock base 62 and the lock plate 64. The lock plate 64 is urged by the tension spring 67 such that the claw 64a can engage the striker 61.

A guide block 68 is attached to the upper surface of the forward end portion of the operation arm 66. A guide roller 69 is rotatably attached to the upper surface of the forward end portion of the guide block 68. The rotation base 31 is formed with a retention slot 31a that passes through the rotation base 31. The retention slot 31a is formed so as to extend in a direction perpendicular to a moving direction of the seat body 10 caused by the second slide mechanism 40, which will be described hereinafter. The above-mentioned guide block 68 is received in the retention slot 31a. As a result, the guide roller 69 is upwardly projected from the upper surface of the rotation base 31. The guide block 68 is retained in the retention slot 31a so as to be movable therealong. Therefore, the operation arm 66 can move in parallel along the vertical direction in FIG. 7.

An end portion of the operation arm 66 is formed with an elongated slot shaped clearance hole 66a. The axle 65 is received in the clearance hole 66a. When the axle 65 relatively moves with respect to the operation arm 66 within the clearance hole 66a, linear movement of the operation arm 66 and rotary movement of the lock plate 64 are permitted. When the operation arm 66 moves in parallel along the vertical direction in FIG. 7 while relatively moving the axle 65 within the clearance hole 66a, the lock plate 64 tilts vertically in FIG. 7 around the axle 63. In FIG. 7, chain double-dashed lines show a condition in which the lock plate 64 and the operation arm 66 have moved to a lower unlockd position.

As indicated by solid lines in FIG. 7, in a condition in which the guide roller 69 is located in an upper lock position so that the operation arm 66 is positioned relatively near in the upper side in the drawing, the lock plate 64 is pulled relatively near to the upper side in the drawing by the tension spring 67. As a result, the claw 64a engages the striker 61 so that the rotation base 31 and consequently the seat body 10 are unrotatably locked in the position where the seat body 10 faces the front side of the vehicle. Due to the fact that the lock plate 64 is forced toward a lock direction by the tension spring 67, the operation arm 66 and consequently the guide roller 69 are indirectly biased toward the lock position.

Conversely, when the guide roller 69 is pushed to a lower unlock position against the indirect biasing force of the tension spring 67 so that the operation arm 66 is displaced downwardly in the drawing, the lock plate 64 moves toward the unlock position indicated by the chain double-dashed lines in FIG. 7. As a result, the claw 64a is disengaged from the striker 61, the rotation base 31 and consequently the seat body 10 can rotate from the position where the seat body 10 faces the front side of the vehicle to the position where the seat body 10 faces the door opening K.

The movement of the guide roller 69 toward an unlock direction against the force of the tension spring 67 (i.e., an unlock operation of the rotation lock mechanism 60) is carried out by utilizing operations of an ascent/descent device 70 of the second slide mechanism 40, which will be described below.

Next, the second slide mechanism 40 may function to raise and lower the seat body 10 between a position higher than the floor F and a position lower than the floor F (and closer to the road surface) while moving the seat body 10 in the lateral direction of the vehicle (the right and left direction in FIGS. 2 to 4) under a condition in which the seat body 10 faces the door opening K. The second slide mechanism 40 includes a movement base 41 that can slide in the longitudinal direction of the seat body with respect to the rotation base 31, the ascent/descent driving device 70 for moving the movement base 41, and a pair of right and left ascent/descent arms 44 and 44, tiltably supported by the movement base 41 and supporting the seat body 10 at the forward end portion of the ascent/descent arms 44 and 44.

Figure 9:
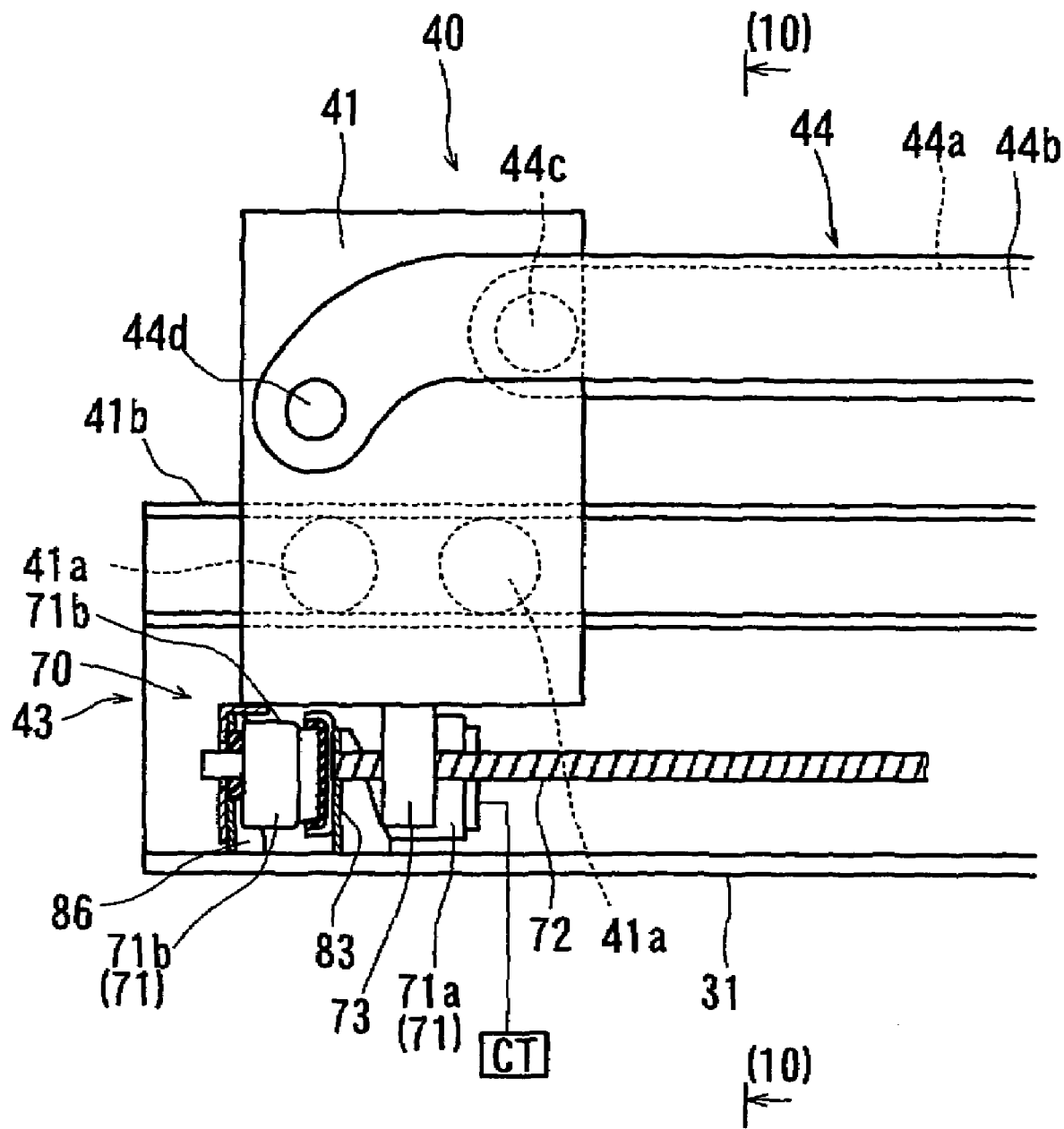
FIG. 9 is an enlarged view of portion (9) shown in FIG. 3, which corresponds to a side view of a movement base of the ascent/descent slide mechanism and its surroundings.
Figure 10:
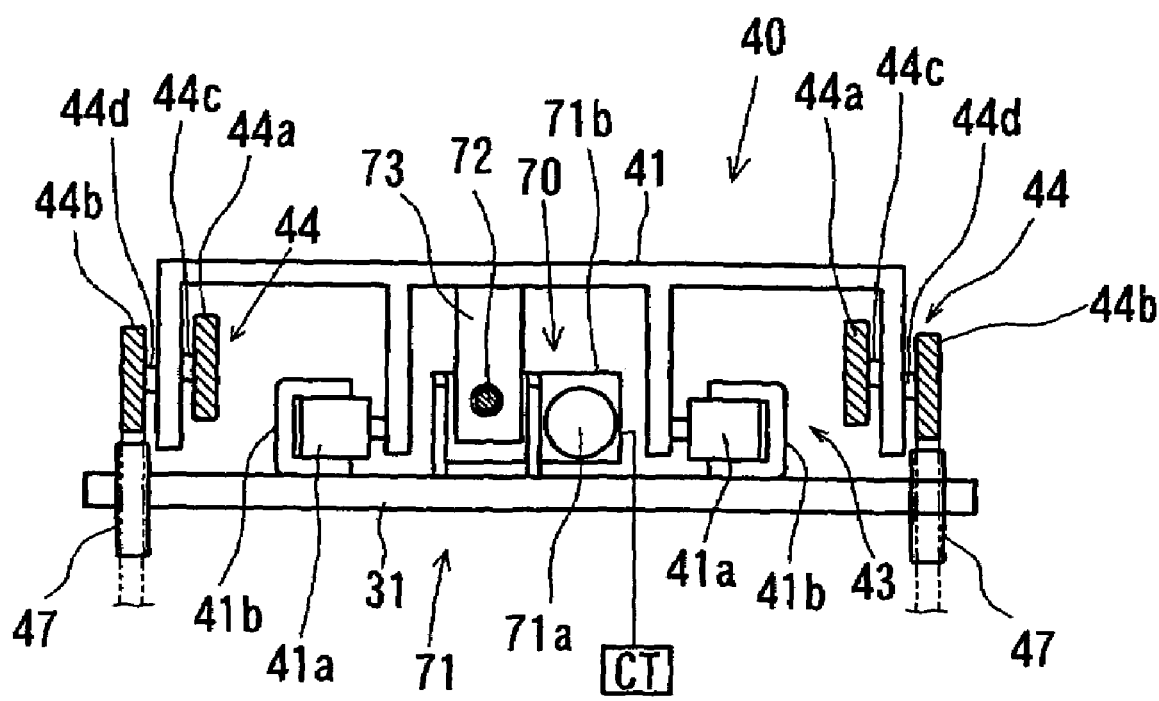
FIG. 10 is a view viewed from line (10)-(10) shown in FIG. 9, which corresponds to a vertical sectional view of the ascent/descent slide mechanism.

As shown in FIGS. 9 and 10, the movement base 41 is slidably supported by guide rails 41b and 41b that have a U-shaped sectional configuration and are arranged in parallel to each other near both end edges of the rotation base 31. The movement base 41 is slidably supported via two guide rollers 41a and 41a for each of the guide rails 41b and 41b. The guide rollers 41a and 41a are rotatably mounted to the side surfaces of the movement base 41 so as to be spaced apart from each other at desired intervals along a sliding direction.

The ascent/descent driving device 70 is disposed between the movement base 41 and the rotation base 31. The ascent/descent driving device 70 includes a driving motor 71, a screw shaft 72 and a nut 73. In this embodiment, the nut 73 corresponds to "a member that can move upon operation of the slide mechanism" as defined in the claims.

The driving motor 71 has a motor main body 71a and a speed reduction device 71b for reducing the output force of the motor main body 71a. Although not shown, the speed reduction device 71b contains a gear train that has an input side connected to an output shaft of the motor main body 71a and an output side connected to the screw shaft 72.

The speed reduction device 71b is supported by brackets 83 and 86 so that the driving motor 71 is fixed onto the rotation base 31. The nut 73, meshing with the screw shaft 72, is fixed to the lower surface of the movement base 41.

As described above, the second slide mechanism 40 is disposed between the seat body 10 and the rotation mechanism 30 so as to integrally rotate with the seat body 10. Therefore, when the second slide mechanism 40 is operated under a condition in which the seat body 10 faces the front side of the vehicle, the moving direction of the seat body corresponds to the longitudinal direction of the vehicle. On the contrary, when the second slide mechanism 40 is operated under the condition in which the seat body 10 faces the door opening K, the moving direction of the seat body 10 corresponds to the lateral direction of the vehicle.

In the condition in which the seat body 10 faces the front side of the vehicle and in which the second slide mechanism 40 is directed so as to move the seat body 10 in the longitudinal direction of the vehicle, as shown in FIGS. 6 and 7, when the movement base 41 and consequently the nut 73 are positioned in an original position where they are most retracted into the interior of the vehicle, the guide roller 69 of the rotation lock mechanism 60 is positioned in the vicinity of the nut 73 (obliquely forward with respect to the advancing direction). A guide plate 74 is attached to a side portion of the nut 73 so as to be opposed to the guide roller 69. Both end portions of the guide plate 74 are bent in the direction away from the guide roller 69, thereby forming guide surfaces 74a. When the screw shaft 72 rotates upon the actuation of the driving motor 71 so that the nut 73 and consequently the movement base 41 begin to move leftwardly in the drawings from the original position shown in FIGS. 6 and 7, the guide roller 69 is pressed downwardly in the drawing while the guide roller 69 is guided by the guide surface 74a of the guide plate 74. When the guide roller 69 is pressed downwardly in the drawing, the guide block 68 moves linearly downwardly in the drawing along the retention slot 31a. As a result, as described above, the lock plate 64 of the rotation lock mechanism 60 moves toward the unlock direction against the force of the tension spring 67. At this time, the seat body 10 moves slightly (across the same distance as the moving distance of the nut 73) toward the front side of the vehicle while it faces the front side of the vehicle.

In this embodiment, when the nut 73 moves by approximately 20 mm from the original position indicated by the solid lines in FIG. 7, and stops at a rotation lock release position indicated by the chain double-dashed lines in the drawing, the guide roller 69 is pressed to the lowermost position in the drawing. As a result, the lock plate 64 is retained in the unlock position so that the overall rotation lock mechanism 60 is maintained in an unlock condition. Further, the motion in which the nut 73 moves by approximately 20 mm from the original position of this embodiment corresponds to the motion that "the slide mechanism is slightly operated" as described in the claims.

Figure 5:
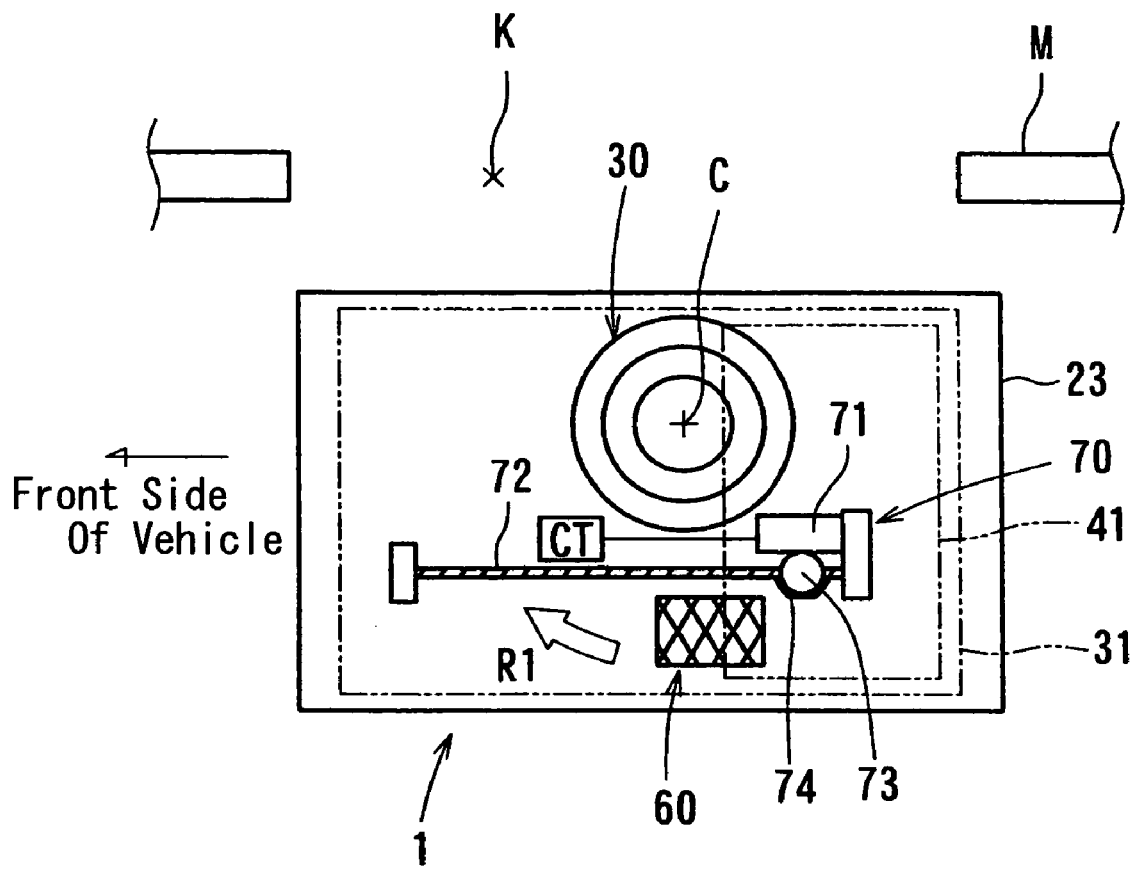
FIG. 5 is a plan view showing the positional relationship between the vehicle seat and the vehicle, and the positional relationship among a rotation mechanism, a rotation lock mechanism and an ascent/descent driving device.

When the rotation motor 32 is actuated so as to move the seat body toward the vehicle exterior under the condition that the rotation lock mechanism 60 is maintained in the unlock condition, the rotation base 31 and consequently the seat body 10 rotate clockwise around the rotation center C of the rotation mechanism 30, as indicated by outlined arrows R1 in FIGS. 5 and 7. Therefore, the second slide mechanism 40 provided on the rotation base 31 side and the respective components of the rotation lock mechanism 60 (except for the striker 61) also move in the direction of arrow R1. Even if the seat body 10 rotates toward the door opening K, the position of the striker 61 is not changed because the striker 61 is fixed onto the longitudinal slide base 23. Consequently, the lock plate 64 becomes positioned remote from the striker 61.

Therefore, in the condition in which the seat body 10 faces the door opening K and in which the second slide mechanism 40 is directed so as to slide the seat body 10 in the lateral direction of the vehicle, the seat body 10 can be moved to the exterior of the vehicle by actuating the driving motor 71 of the ascent/descent driving device 70. At this stage, if the driving motor 71 is actuated so as to move the seat body toward the vehicle exterior, the nut 73 further moves along the screw shaft 72 and is transversely disengaged from the guide roller 69 (dislocated from the rotation lock release position). As a result, the operation arm 66 and the guide roller 69 are returned in the lock direction because they are biased toward the lock direction due to the indirect action of the tension spring 67. Further, in the condition in which the seat body 10 faces the door opening K, the rotation lock mechanism 60 does not function.

Next, an ascent/descent slide mechanism 43 is constructed from the movement base 41, the guide rails 41b and 41b, the guide rollers 41a and 41a, and the ascent/descent driving device 70, which are all described above. In addition, the second slide mechanism 40 is mainly constructed from the ascent/descent slide mechanism 43, a pair of right and left ascent/descent arms 44 and 44, and an auxiliary slide base 45. The ascent/descent arms 44 and 44 and an auxiliary slide base 45 will be described below.

As shown in FIGS. 2 to 4 and FIG. 9, the pair of right and left ascent/descent arms 44 and 44 are respectively attached to both side portions of the movement base 41 so as to be vertically tiltable. Further, the term "right and left" refers to the right and left as seen by an occupant that is seated on the seat body 10. The ascent/descent arms 44 and 44 are formed symmetrically with each other. One of the ascent/descent arms 44 and 44 will be described below. The ascent/descent arm 44 includes an upper arm 44a and a lower arm 44b.

Figure 12:
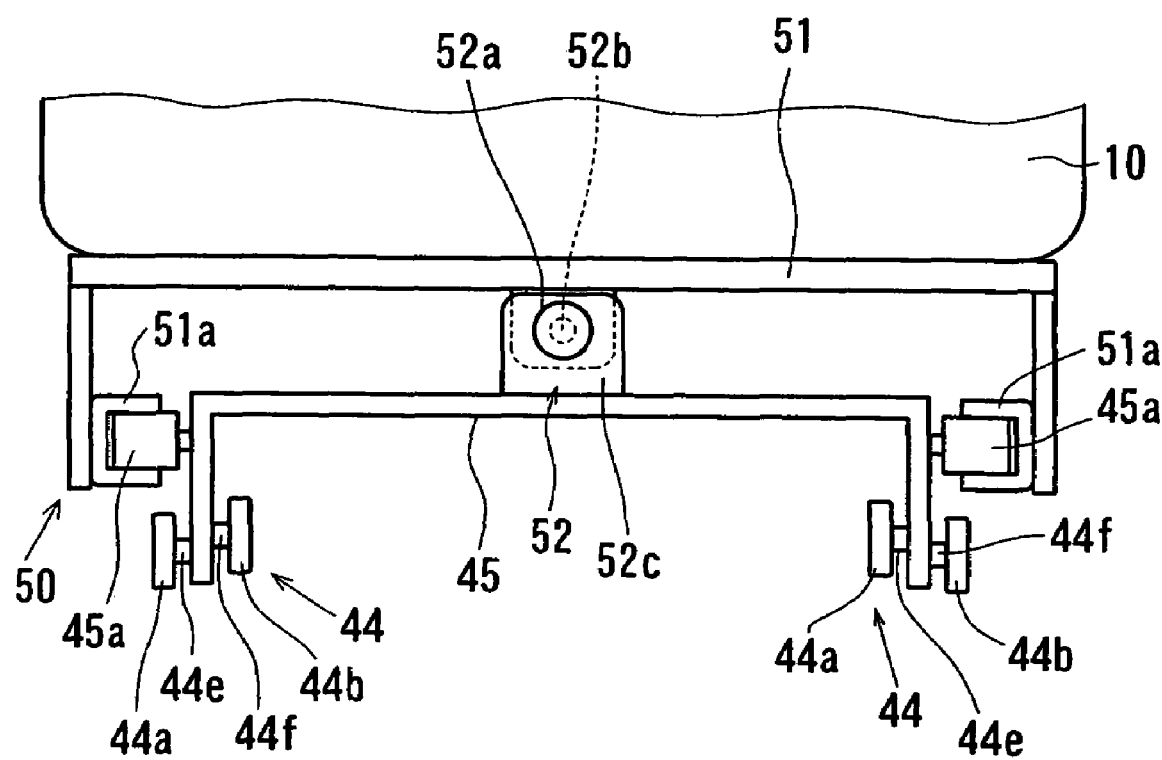
FIG. 12 is a view of the auxiliary slide mechanism, which is viewed from the direction of arrow (12) shown in FIG. 11.

One end portion of the arm 44a is vertically rotatably supported on the side portion of the movement base 41 via an axle 44c. The other end portion of the arm 44a is rotatably connected to the side portion of the auxiliary slide base 45 via an axle 44e. One end portion of the arm 44b is vertically rotatably supported on the side portion of the movement base 41 via an axle 44d. The other end portion of the arm 44b is rotatably connected to the side portion of the auxiliary slide base 45 via an axle 44f. As shown in FIGS. 10 and 12, in order to prevent mutual interference of the upper arm 44a and the lower arm 44b, the arms 44a and 44b are disposed so as to be spaced apart from each other along the lateral direction of the seat body 10 (along the thickness direction of the arms 44a and 44b).

When the arms 44a and 44b are vertically tilted, the auxiliary slide base 45 is displaced vertically while moving in the lateral direction of the vehicle. At this time, the second slide mechanism 40 is directed so as to slide the seat body 10 in the lateral direction of the vehicle. Therefore, the seat body 10 ascends or descends while moving in the lateral direction of the vehicle. The length of the arms 44a and 44b and the distance between the axles 44c, 44d, 44e, and 44f, are appropriately determined such that the auxiliary slide base 45 and the seat body 10 may always be displaced in parallel to each other without being tilted longitudinally and laterally. Accordingly, the occupant may not be inclined.

Mounted to the front end portion of the rotation base 31 are a pair of right and left arm receiving members 47 and 47 corresponding to the right and left lower arms 44b and 44b. The right and left lower arms 44b and 44b described above are respectively seated on the arm receiving members 47 and 47. When the movement base 41 moves in the lateral direction of the vehicle upon the operation of the ascent/descent slide mechanism 43, the right and left lower arms 44b and 44b move integrally with the movement base 41 while each is constantly supported from below by an arm receiving member 47. That is, when the movement base 41 and the ascent/descent arms 44 and 44 move, the arm receiving members 47 and 47 roll along the lower surfaces of the lower arms 44b and 44b.

Thus, upon movement of the movement base 41 toward the exterior of the vehicle, the larger the moving distance of the ascent/descent arms 44 and 44 toward the exterior of the vehicle, the smaller the distance between each of the axles 44d of the lower arms 44b and the corresponding arm receiving member 47. As a result, the upper arms 44a and the lower arms 44b respectively rotate downwardly (counterclockwise in FIG. 4) around the axles 44c and the axles 44d. When both ascent/descent arms 44 and 44 accordingly rotate downwardly, the auxiliary slide base 45 and the seat body 10 facing the door opening K are displaced downwardly while moving to the exterior of the vehicle. FIG. 4 shows that after the seat body 10 is directed so as to face the door opening K in a vehicle cabin, the seat body 10 is moved to the outermost position of the exterior of the vehicle via the door opening K by means of the second slide mechanism 40 and at the same time, the seat body 10 is lowered to its lowest position, exterior to the vehicle.

On the contrary, upon movement of the movement base 41 into the interior of the vehicle, the larger the moving distance of the ascent/descent arms 44 and 44 toward the interior of the vehicle, the larger the distance between the axles 44d of the lower arms 44b and the arm receiving members 47. As a result, the upper arms 44a and the lower arms 44b respectively rotate upwardly (clockwise in FIG. 4) around the axles 44c and the axles 44d. When both ascent/descent arms 44 and 44 accordingly rotate upwardly, the auxiliary slide base 45 and the seat body 10 are displaced upwardly while moving to the interior of the vehicle.

Figure 11:
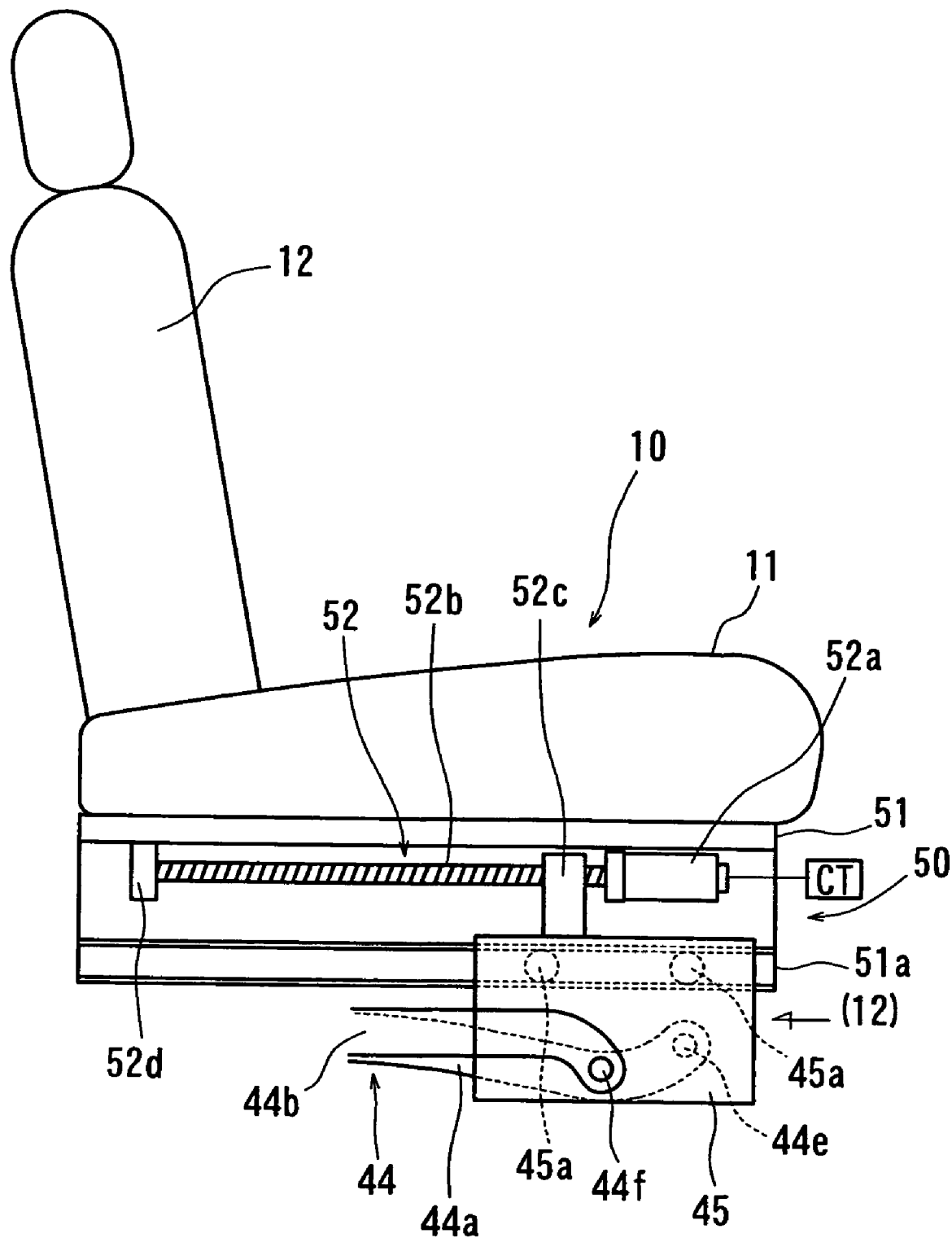
FIG. 11 is a side view of the auxiliary slide mechanism.

Next, as shown in FIGS. 10 and 11, the seat body 10 is supported on the upper surface side of the auxiliary slide base 45 via an auxiliary slide mechanism 50. The seat body 10 is supported by the auxiliary slide mechanism 50 so as to be slidable in the longitudinal direction of the seat body 10, with respect to the auxiliary slide base 45.

The seat body 10 is disposed on the auxiliary slide mechanism 50. The auxiliary slide mechanism 50 includes a seat support base 51 that can slide with respect to the auxiliary slide base 45. The seat support base 51 has the same sliding direction as the movement base 41. The sliding direction of the seat support base 51 corresponds to the lateral direction of the vehicle when the seat body 10 faces the door opening K. Also, the sliding direction of the seat support base 51 corresponds to the longitudinal direction of the vehicle when the seat body 10 faces the front side of the vehicle. Two guide rails 51a and 51a are attached to the right and left side portions of the lower surface of the seat support base 51. The guide rails 51a and 51a have a U-shaped sectional configuration and are arranged in parallel with each other. The guide rails 51a and 51a respectively rotatably receive a plurality (e.g., two are shown in FIG. 10) of guide rollers 45a-45a that are rotatably attached to the right and left side portions of the auxiliary slide base 45. Thus, the seat support base 51 is supported so as to be slidable with respect to the auxiliary slide base 45.

Provided between the auxiliary slide base 45 and the seat support base 51 is a driving device 52 for auxiliary sliding. The driving device has a driving motor 52a, a screw shaft 52b rotated by the driving motor 52a, and a nut 52c meshing with the screw shaft 52b. The driving motor 52a is attached to the lower surface of the seat support base 51 via a bracket (not shown). The forward end portion of the screw shaft 52b is rotatably supported by a retention block 52d that is attached to the lower surface of the seat support base 51. The nut 52c is fixed onto the upper surface of the auxiliary slide base 45.

When the screw shaft 52b rotates upon the actuation of the driving motor 52a under the condition in which the seat body 10 faces the door opening K, the screw shaft 52*b* moves in the axial direction thereof because the screw shaft 52*b* meshes with the nut 52*c*. As a result, the seat body 10 moves in the lateral direction of the vehicle with respect to the auxiliary slide base 45.

In this way, the seat body 10 moves in the lateral direction of the vehicle in two stages by means of the ascent/descent slide mechanism 43 and the auxiliary slide mechanism 50. However, the movement of the seat body 10 caused by the auxiliary slide mechanism 50 is a horizontal movement along the lateral direction of the vehicle and does not involve vertical displacement. Whereas the movement of the seat body 10, caused by the ascent/descent slide mechanism 43, involves not only a movement in the lateral direction of the vehicle but also the vertical movement in addition to the lateral movement as described above. As a result, the latter movement is different from the former movement in that the seat body 10 in the latter movement moves along an upwardly curved arcuate track. That is, when the movement base 41 is moved from a retracted position to an advanced position, the ascent/descent arms 44 rotate downwardly (in a direction in which the forward ends of the arms 44 can be displaced downwardly) while moving toward the exterior of the vehicle. As a result, the auxiliary slide base 45 and consequently the seat body 10 move (descend) from a raised position to a lowered position along the arcuate track. On the contrary, when the movement base 41 is moved from the advanced position to the retracted position, the ascent/descent arms 44 rotate upwardly (in a direction in which the forward end of the arms 44 can be displaced upwardly) while moving toward the interior of the vehicle. As a result, the seat body 10 is returned from a lowered position to a raised position along the arcuate track.

The starting, stopping, rotating speed, and rotating direction of the longitudinal slide motor 24*a* of the first slide mechanism 20, the rotation motor 32 of the rotation mechanism 30, the driving motor 71 of the ascent/descent slide mechanism 43, and the driving motor 52*a* of the auxiliary slide mechanism 50, are all controlled by a control means CT.

Further, although not shown, an operation switch for starting and stopping the vehicle seat 1 is disposed in the vicinity of the seat body 10. This operation switch is a so-called seesaw-type switch. Therefore, when the switch is continuously depressed toward one side or "a get-in mode side", the seat body 10 moves from the exterior to the interior of the vehicle so that the occupant can get in the vehicle M. Also, when the switch is continuously depressed toward the other side or "a get-out mode side," the seat body 10 moves from the interior to the exterior of the vehicle so that the occupant can get out of the vehicle M.

That is, when the operation switch is continuously depressed or operated toward the get-out mode side, the following operations can be automatically performed in a predetermined order: the operation of the second slide mechanism 40 before the rotation lock mechanism 60 releases a rotation lock condition of the seat body 10, the rotating movement of the seat body 10 and the sliding movement of the seat body 10 in the longitudinal direction of the vehicle of the seat body 10 after a rotation lock is released, and the operation of the rotation mechanism 30 and the second slide mechanism 40 before the seat body 10 faces the door opening K and moves to a predetermined position exterior to the vehicle. When the operation switch is continuously depressed or operated toward the get-in mode side, the series of operations can be automatically performed in the reverse order to the above order. Therefore, there is no need for the occupant or the care personnel to individually perform operations for locking and unlocking the rotation of the seat body 10. These operations are automatically performed as a part of the operation for moving the seat body 10 between the vehicle interior and the vehicle exterior.

The vehicle seat 1, constructed as described above, may move as follows. The seat body 10 is moved from the vehicle interior to the vehicle exterior so that the occupant can get out of the vehicle from the vehicle interior to the vehicle exterior. On the contrary, the seat body 10 is returned from the vehicle exterior to the vehicle interior so that the occupant can reach a seating position (e.g., a passenger seat position) in the vehicle.

First, as indicated by the chain double-dashed lines in FIG. 1, in the seating position in which the occupant (the seat body 10) faces the front side of the vehicle (at this time, the second slide mechanism 40 is directed so as to slide the seat body 10 in the longitudinal direction of the vehicle), the movement base 41 of the ascent/descent slide mechanism 43 is maintained at a rear end position. Therefore, the nut 73 of the ascent/descent driving device 70 is positioned at the original position (the position indicated by the solid lines in FIG. 7). In the condition in which the nut 73 is maintained at the original position so as to be dislocated from the rotation lock release position, the guide roller 69 and the operation arm 66 are retained in the lock position by means of the indirect action of the tension spring 67. In this condition, the claw 64*a* of the lock plate 64 engages the striker 61 so that the rotation base 31 and consequently the seat body 10 are unrotatably locked.

In order to move the seat body 10 to the exterior of the vehicle so that the occupant can get out of the vehicle, the occupant or the care personnel depresses the operation switch toward the get-out mode side. When the switch is depressed, the driving motor 71 of the ascent/descent driving device 70 in the ascent/descent slide mechanism 43 is initially actuated under the condition in which the seat body 10 faces the front side of the vehicle. As a result, the screw shaft 72 rotates so that the nut 73 moves toward the front side of the vehicle by approximately 20 mm, from the original position (indicated by the solid lines in FIG. 7) to the rotation lock release position (indicated by the chain double-dashed lines in FIG. 7). At this position, the driving motor 71 is temporarily stopped so that the nut 73 is retained at the rotation lock release position. During this time, the seat body 10 also integrally moves with the nut 73 toward the front side of the vehicle by approximately 20 mm.

When the nut 73 is moved to the rotation lock release position, the guide roller 69 is pushed while it is guided by the guide surface 74*a* of the guide plate 74. As a result, the guide roller 69 is held in the rotation lock release position, indicated by the chain double-dashed lines in FIG. 7, so that the operation arm 66 moves in parallel to the position also indicated by the chain double-dashed lines. The movement of the guide roller 69 and the operation arm 66 toward the rotation lock release position is performed against the force of the tension spring 67.

When the operation arm 66 moves toward the rotation lock release position, the lock plate 64 rotates toward the unlock direction around the axle 63. As a result, the claw 64a is disengaged from the striker 61 so that the rotation base 31 and then the seat body 10 can rotate toward the door opening.

After the rotation lock mechanism 60 has been thus placed in the rotation lock release condition, the switch is further continuously depressed toward the get-out mode side. Consequently, the longitudinal slide motor 24*a* of the first slide mechanism 20 is actuated for a normal rotation so that the seat body 10 slides toward the front side of the vehicle. At the same time, the rotation motor 32 of the rotation mechanism 30 is also actuated for a normal rotation so that the seat body 10 and the second slide mechanism 40 rotate by approximately 90 degrees toward the door opening K (toward the direction as indicated by outlined arrows R1 in FIGS. 5 and 7) while it slides in the longitudinal direction of the vehicle. When the seat body 10 and the second slide mechanism 40 are rotated by approximately 90 degrees and are placed in the condition in which they face the door opening K, the sliding direction of the ascent/descent slide mechanism 43 and the auxiliary slide mechanism 50 corresponds to the lateral direction of the vehicle. FIG. 2 illustrates this condition.

When the operation switch is further continuously depressed toward the get-out mode side after the seat body 10 has been directed toward the door opening K, the driving motor 52a of the auxiliary slide mechanism 50 is then actuated for a normal rotation so that the seat body 10 is horizontally moved toward the exterior of the vehicle by way of the door opening K. FIG. 3 shows a condition in which the seat body 10 has slid to the forward limit of a sliding range of the seat body by the auxiliary slide mechanism 50.

Next, when the operation switch is further depressed toward the get-out mode side, the driving motor 71 of the ascent/descent slide mechanism 43 is actuated again so that the movement base 41 moves from the lock release position shown in FIG. 3 toward the door opening K. At this stage, the nut 73 is removed from the rotation lock release position so that the guide roller 69 and the operation arm 66 are returned to a rotation lock position by the indirect action of the tension spring 67. As a result, the lock plate 64 is returned to the rotation lock position by the force of the tension spring 67. However, at this stage the rotation base 31 has been rotated by approximately 90 degrees toward the door opening K, relative to the previous position where it faces the front side of the vehicle. Therefore, as stated above, the lock plate 64 is positioned remote from the striker 61. Consequently, at this stage the rotation lock mechanism 60 does not function.

When the movement base 41 moves toward the exterior of the vehicle, the seat body 10 moves toward the exterior of the vehicle together with the ascent/descent arms 44 and 44. Further, as described above, when the ascent/descent arms 44 and 44 move toward the exterior of the vehicle, the upper arms 44a and 44a and the lower arms 44b and 44b respectively rotate downwardly around the axles 44c and 44d. Therefore, the seat body 10 is lowered to a level closer to the road surface while moving to the exterior of the vehicle. FIG. 4 shows the condition in which the movement base 41 has slid to the forwad limit position of the sliding range of the sliding base by the ascent/descent slide mechanism 43. At this stage, the seat body 10 has been moved by a sufficient distance toward the exterior of the vehicle and is lowered to a level close to the road surface. Therefore, the occupant can be easily transferred to, for example, a wheelchair that is placed adjacent to the seat body 10. When the operation switch is continuously depressed toward the get-in mode side after the occupant has been transferred to the wheelchair (such that no occupant is seated on the seat body 10), the seat body 10 is returned into the interior of the vehicle by operations reverse to the above.

For the getting-in operation, the occupant is transferred from the wheelchair to the seat body 10, previously moved to the exterior of the vehicle, and is then seated on the seat body 10. Thereafter, when the operation switch is continuously depressed toward the get-in mode side, the driving motor 71 of the ascent/descent slide mechanism 43 is actuated for a reverse rotation so that the ascent/descent arms 44 and 44 are returned into the interior of the vehicle together with the seat body 10. After the movement base 41 has been moved to the retracted position and the ascent/descent arms 44 and 44 have been returned to the interior of the vehicle, the driving motor 52a of the auxiliary slide mechanism 50 is actuated so that the seat body 10 is returned into the interior of the vehicle. Immediately before the movement base 41 of the ascent/descent slide mechanism 43 is returned to the retracted position, the nut 73 of the ascent/descent driving device 70 passes the rotation lock release position. Therefore, at this stage, the rotation lock mechanism 60 is still maintained in a locked condition (the condition in which the guide roller 69 is retained in the position indicated by the solid lines in FIG. 7 by the indirect action of the force of the tension spring 67).

After the movement base 41 has been returned to the retracted position and the seat body 10 has been returned to the interior of the vehicle, the rotation motor 32 of the rotation mechanism 30 and the longitudinal slide motor 24a of the first slide mechanism 20 are actuated so that the seat body 10 is slid rearwardly while it is rotated by approximately 90 degrees toward the position where the seat body 10 faces the front side of the vehicle. Therefore, the occupant can reach a predetermined seating position. During this process, the occupant can remain seated on the seat body 10. Therefore, the labor of the occupant and the care personnel can be significantly reduced.

Figure 8:
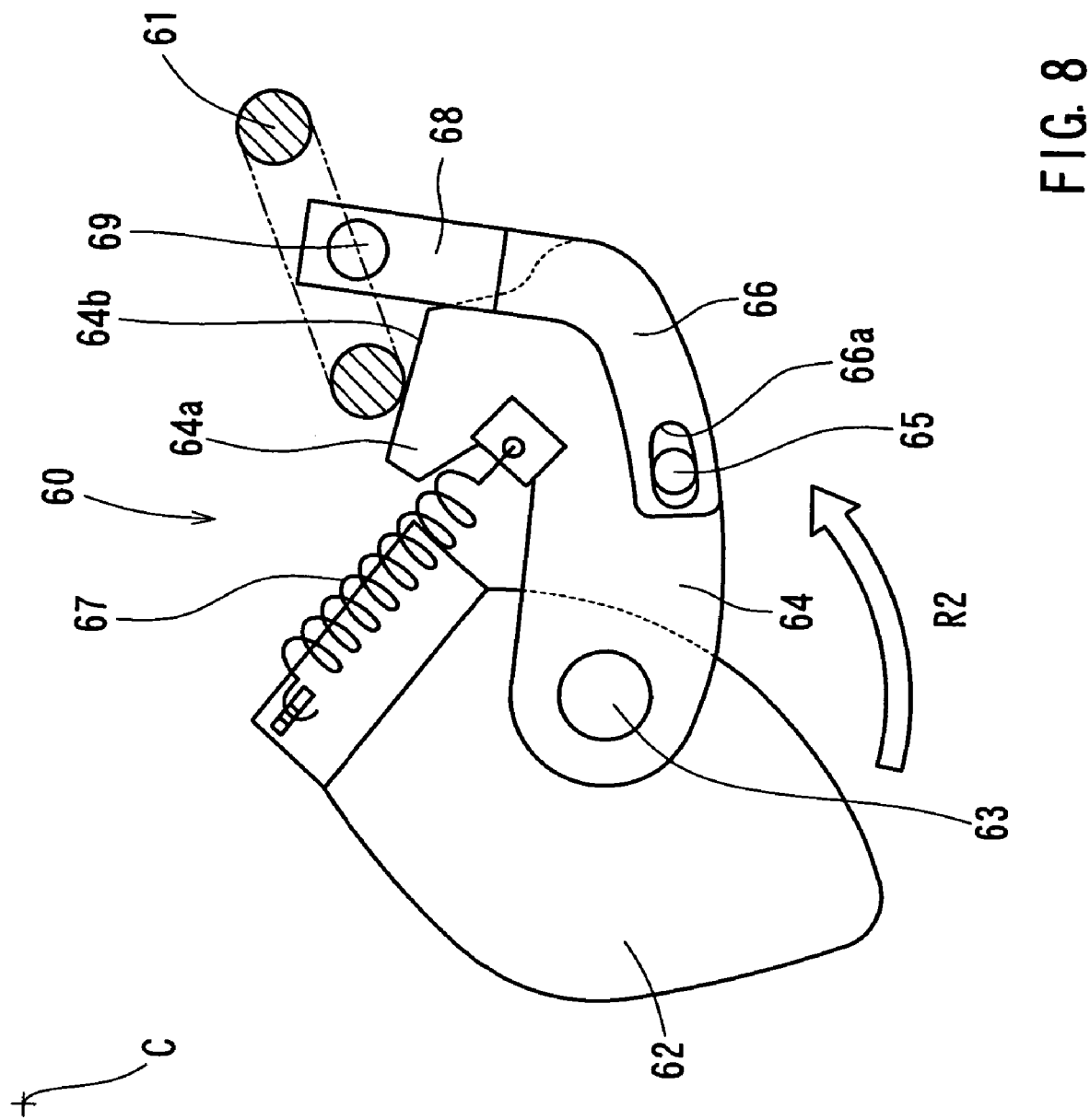
FIG. 8 is a plan view showing the positional relationship between a lock plate and a striker when the seat body is returned to the position where it faces the front side of the vehicle.

At the stage where the seat body 10 rotates from the position where it faces the door opening K to the position where it faces the front side of the vehicle (the stage where the seat body 10 rotates toward the direction as indicated by the open arrow R2 in FIG. 8), immediately before the seat body 10 is returned to the position where it faces the front side of the vehicle, the lock plate 64 approaches the striker 61. A guide surface 64b is formed in the forward end portion of the lock plate 64. Immediately before the seat body 10 is returned to the position where it faces the front side of the vehicle, the guide surface 64b of the lock plate 64 contacts the striker 61. FIG. 8 shows this contacting condition. When the seat body 10 continues to further rotate toward the position where it faces the front side of the vehicle (in the direction of the arrow R2) while the guide surface 64b contacting the striker 61, the lock plate 64 temporarily rotates to the unlock direction (clockwise around the axle 63 in FIG. 8) against the force of the tension spring 67. When the seat body 10 reaches the position where it faces the front side of the vehicle while rotating the lock plate 64 to the unlock direction, the claw 64a passes the striker 61. At this time, the lock plate 64 is returned to the lock position by the force of the tension spring 67. When the lock plate 64 is thus returned to the lock position, the claw 64a thereof engages the striker 61 so that the seat body 10 is unrotatably locked in the position where it faces the front side of the vehicle. Also the rotation lock operation of the seat body 10 is automatically performed as a part of a series of operations for moving the seat body 10 from the vehicle exterior to the vehicle interior.

According to the vehicle seat 1 of this embodiment that is constructed as described above, the rotation lock mechanism 60 for unrotatably locking the seat body 10 in the position where it faces the front side of the vehicle is constructed so as to be automatically unlocked by utilizing the movement of the ascent/descent slide mechanism 43. Therefore, there is no need for the occupant to perform a lever operation or the like, so that usability can be increased. Further, the rotation lock mechanism 60 can be unlocked without using a dedicated actuator, such as an electric motor as in the prior art, for operating the rotation lock mechanism. Therefore, it is possible to reduce the costs of the vehicle seat 1 and increase the workability of assembly or maintenance.

Further, it is not necessary to use a dedicated actuator for operating the rotation lock mechanism as in the prior art and to transmit power thereto by using a cable or the like. Therefore, it is not necessary to provide a space for receiving the actuator and an additional space for providing a cable or the like. As a result, it is possible to increase the degree of freedom in the arrangement of other components or apparatuses. Further, this may lead to a reduction in the size of the rotation lock mechanism and subsequently a reduction in the size of the vehicle seat.

The embodiment described above can be variously modified. For example, the motion of the nut 73 in moving by approximately 20 mm from the original position in order to unlock the rotation lock mechanism is exemplified as the motion "slightly operating the slide mechanism." However, the moving distance of the nut 73 required for unlocking the rotation lock mechanism 60 can be set to a distance longer or shorter than this exemplified distance. What is important is that when the seat body 10 is rotated from the position where it faces the front side of the vehicle toward the door opening, the seat body 10 is moved by a slight distance within a range in which the seat body 10 does not interfere with the vehicle body or interior parts. However, it is desirable that the distance is as short as possible in order to diminish the change in the seating position of the occupant in the interior of the vehicle.

Further, the structure is exemplified in which the rotation lock condition is released by utilizing the movement of the nut 73. However, if the nut of the ascent/descent driving device is fixed to the rotation base 31 side and the driving motor and the screw shaft are mounted to the side of the movement base 41 so that the driving motor and the screw shaft move in the lateral direction of the vehicle, it is possible to construct the vehicle seat such that the guide roller 69 is displaced by utilizing these movements, thereby releasing the rotation lock condition.

Also, it is possible to omit the auxiliary slide mechanism 50 so that the seat body 10 can be moved in the lateral direction of the vehicle only by the ascent/descent slide mechanism 43. Further, the second slide mechanism 40 in the above example has a function to vertically displace the seat body 10. However, the second slide mechanism 40 can be constructed to simply displace the seat body 10 horizontally along the lateral direction of the vehicle without vertically displacing the seat body 10.

Further, the rotation lock release mechanism of the present invention can be applied to a vehicle seat that is not provided with the first slide mechanism 20, in which a vehicle seat simply has the functions to rotate the seat body 10 and to move the seat body 10 in the lateral direction of the vehicle.

Further, the embodiment exemplifies the second slide mechanism 40 (the ascent/descent slide mechanism 43) in which the movement base 41 and then the seat body 10 are moved in the lateral direction of the vehicle by the screw shaft 72 and the nut 73 meshing with the screw shaft (a screw shaft mechanism). However, the rotation lock release mechanism of the present invention can be applied to a slide mechanism that moves the seat body 10 in the lateral direction of the vehicle by a rack-pinion mechanism, a link arm mechanism or other such mechanisms that utilize an electric motor as a drive source.

Further, in this embodiment, the vehicle seat is positioned in the second seat row behind the driver's seat (right side of the vehicle). However, the vehicle seat can be positioned as a driver's seat or a passenger seat. In addition, the vehicle seat can be positioned as a seat that is designed to be let in and out of the vehicle through a back door.

The invention claimed is:

1. A vehicle seat comprising:
a rotation mechanism disposed between a seat body and a vehicle floor, the rotation mechanism being arranged and constructed to rotate the seat body between a position where the seat body faces a front side of a vehicle and a position where the seat body faces a door opening;
a rotation lock mechanism arranged and constructed to unrotatably lock the seat body in
a position where the seat body faces the front side of the vehicle;
a slide mechanism arranged and constructed to move the seat body in a condition in which the seat body faces the door opening toward an exterior of the vehicle by way of the door opening;
wherein when the slide mechanism is slightly operated under a condition in which the seat body faces the front side of the vehicle, a member that can move thereupon moves and interacts with the rotation lock mechanism, thereby operating the rotation lock mechanism such that the seat body can be unlocked; and
wherein the slide mechanism is disposed between the seat body and the rotation mechanism so as to rotate integrally with the seat body, wherein when the slide mechanism is operated under the condition in which the seat body faces the front side of the vehicle, a moving direction of the seat body corresponds to a longitudinal direction of the vehicle, and wherein when the slide mechanism is operated under the condition in which the seat body faces the door opening, the moving direction of the seat body corresponds to a lateral direction of the vehicle.

2. The vehicle seat as defined in claim 1 further comprising a control means, the control means automatically and sequentially performs the operation of the slide mechanism before the rotation lock mechanism unlocks the seat body, and the operation of the rotation mechanism and the slide mechanism before the seat body faces the door opening and moves to a predetermined position in the exterior of the vehicle.

3. A vehicle seat comprising:
a rotation mechanism disposed between a seat body and a vehicle floor, the rotation mechanism being arranged and constructed to rotate the seat body between a position where the seat body faces the front side of a vehicle and a position where the seat body faces a door opening;
a rotation lock mechanism arranged and constructed to unrotatably lock the seat body in a position where the seat body faces the front side of the vehicle;
a slide mechanism arranged and constructed to move the seat body in a condition in which the seat body faces the door opening toward the exterior of the vehicle by way of the door opening;
wherein when the slide mechanism is slightly operated under a condition in which the seat body faces the front side of the vehicle, a member that can move thereupon moves and interacts with the rotation lock mechanism, thereby operating the rotation lock mechanism such that the seat body can be unlocked; and
wherein the slide mechanism includes a motor, a screw shaft rotated by the motor, and a nut meshing with the screw shaft, wherein when the screw shaft is rotated, the nut moves relative to the rotation mechanism so as to move the seat body, and wherein when the slide mechanism is slightly operated under the condition in which the seat body faces the front side of the vehicle, the nut moves thereupon and interacts with the rotation lock mechanism, thereby operating the rotation lock mechanism such that the seat body can be unlocked.

4. The vehicle seat as defined in claim 3 further comprising a control means, the control means automatically and sequentially performs the operation of the slide mechanism before the rotation lock mechanism unlocks the seat body, and the operation of the rotation mechanism and the slide mechanism before the seat body faces the door opening and moves to a predetermined position in the exterior of the vehicle.

* * * * *